United States Patent [19]

Uchida et al.

[11] Patent Number: 5,341,250
[45] Date of Patent: Aug. 23, 1994

[54] VIDEO SIGNAL DIGITAL MAGNETIC RECORDING REPRODUCING APPARATUS, WITH VARIABLE LENGTH CODING DATA COMPRESSION

[75] Inventors: Hirofumi Uchida, Neyagawa; Tatsuro Juri, Osaka; Hideki Ohtaka, Neyagawa, all of Japan

[73] Assignee: Matsushita Electric Industrial Co., Ltd., Osaka, Japan

[21] Appl. No.: 27,281

[22] Filed: Mar. 5, 1993

[30] Foreign Application Priority Data

Mar. 5, 1992 [JP] Japan .................. 4-048208

[51] Int. Cl.⁵ .................. G11B 5/09; H04N 5/76
[52] U.S. Cl. .................. 360/48; 358/335
[58] Field of Search .................. 360/32, 48; 358/135, 358/310, 335

[56] References Cited

U.S. PATENT DOCUMENTS

| | | | |
|---|---|---|---|
| 4,907,101 | 3/1990 | Keesen | 360/48 |
| 5,047,852 | 9/1991 | Hanyu et al. | 358/133 |
| 5,073,821 | 12/1991 | Juri | 358/133 |
| 5,173,773 | 12/1992 | Ueda et al. | 358/136 |
| 5,175,631 | 12/1992 | Juri et al. | 358/335 |

FOREIGN PATENT DOCUMENTS 0467717 1/1992 European Pat. Off. .
0471118 2/1992 European Pat. Off. .

OTHER PUBLICATIONS

Yamamitsu, et al. "A Study on Trick Plays for Digital VCR", *IEEE Transactions on Consumer Electronics*, vol. 37, No. 3, pp. 261-266 (Aug., 1991).

*Primary Examiner*—Donald Hajec
*Assistant Examiner*—Won Tae C. Kim
*Attorney, Agent, or Firm*—Ratner & Prestia

[57] ABSTRACT

In a video signal digital magnetic recording and/or reproducing apparatus, an input image data array is rearranged into a different data array appropriate for data compression and then subjected to a data compression by variable length coding. The resulting data are rearranged after the data compression and then recorded sequentially onto a video track of a magnetic tape in the same order as that in the frame. In a high-speed playback mode, only the lower frequency component data is decoded every sync block, so that the data reproduced from one video track adjoin each other in the playback picture on the screen.

12 Claims, 9 Drawing Sheets

VIDEO SIGNAL DIGITAL MAGNETIC RECORDING REPRODUCING APPARATUS, WITH VARIABLE LENGTH CODING DATA COMPRESSION

BACKGROUND OF THE INVENTION

1. Field of the Invention

The present invention relates to a digital magnetic recording and/or reproducing apparatus, and in particular to a digital magnetic recording and/or reproducing apparatus adopting variable length coding data compression for magnetically recording a digital video signal such as a television signal.

2. Description of the Prior Art

In a magnetic recording and/or reproducing apparatus such as a D1-VTR for magnetically recording a digital television signal, in order to achieve improved error correction and error modification capabilities, the order of image data to be recorded onto a track of a recording tape differs from the order in position of the image data located in a frame.

Meanwhile, there have been a lot of reports concerning a magnetic recording and reproducing apparatus for digitally recording compressed data obtained by compressing a television signal utilizing a high-efficiency coding technique for bit rate reduction. For instance, there is a reference literature in the art by Yamamitsu et al.: "A Study on Trick Plays for Digital VCR", IEEE Trans. Consum. Electron, Vol. 37, No. 3, pp. 261–266 (August, 1991). As described in the above-mentioned literature, it is general to use a variable length coding technique for high-efficiency coding.

In a variable length coding method, an orthogonal transformation is effected on data of each image block which is composed of, for example, adjoining 8 pixels×8 lines, and then the resulting orthogonally transformed data is compressed into a specified data length every image block group composed of a specified number of image blocks. Furthermore, for the purpose of achieving an increased compression efficiency, before effecting the variable length coding operation, the order of the image blocks in each image block group included in a frame is rearranged so that the image blocks are located apart from each other in a frame. In such a magnetic recording and reproducing apparatus, the order of image blocks in a frame differs from the order of the image blocks corresponding to the data recorded on a video track of the magnetic recording tape.

Meanwhile, when reproducing data by the magnetic recording and reproducing apparatus in a high-speed playback mode, only a part of the data recorded on the video tracks of the magnetic tape is reproduced. Therefore, when effecting a high-speed playback operation to a magnetic tape on which compressed data are digitally recorded, the resulting playback picture is formed with combination of the image data corresponding to a plurality of frames recorded on the magnetic tape.

Furthermore, the locations of a plurality of image blocks reproduced from one video track are apart from each other in position of the frame.

For the above reasons, image data of different frames are combined in a mosaic pattern in the high-speed playback mode, which also results in a significantly unsightly playback picture on the screen.

SUMMARY OF THE INVENTION

Accordingly, an essential objective of the present invention is to provide a video signal digital magnetic recording and/or reproducing apparatus in which a visually improved playback image data is obtained without a visible degradation in picture quality also in a high-speed playback mode wherein a video signal is recorded in a compressed form.

In order to achieve the above-mentioned objective, a video signal digital magnetic recording and/or reproducing apparatus of the present invention comprises:

input shuffling means for shuffling input image data having an image data memory means for storing image data corresponding to at least one field image data, wherein the input shuffling means divides the one field image data into a specified number of image blocks which are aligned at original image block positions and selectively reads among the specified number of image blocks which are spaced a predetermined distance from each other and aligns said read image blocks in a predetermined order to define one image block group;

coding means for coding the image blocks such that the coded image blocks in each image block group has a total data amount equal to or less than a predetermined data length thereby to effect a variable length coding in each image block;

data length adjusting means for adjusting data length of each image block to form sync block data by cutting a coded image block which has a data length longer than a predetermined sync block data length so as to be equal to one sync block data length and filling the cut data portion to be added to a coded image block which has a data length shorter than one sync block data length; and recording deshuffling means having a coded image data memory means for storing the coded image blocks from the data length adjusting means at positions corresponding to the original image block positions, the coded image data aligned corresponding to the original image block positions being divided into a plurality of stripes in a first direction, each stripe having a data width corresponding to one or more image blocks, wherein the recording deshuffling means sequentially reads the stripes of the coded image data thereby to deshuffle the sync block data.

The video signal digital magnetic recording and/or reproducing apparatus further comprises reproduction shuffling means for rearranging the order of the sync block data reproduced from a magnetic tape into an order of decoding the data.

The video signal digital magnetic recording and/or reproducing apparatus further comprises decoding means for converting the lower frequency component of the coded data included in each sync block into image data of each image block.

The video signal digital magnetic recording and/or reproducing apparatus further comprises output deshuffling means for deshuffling the decoded image data and rearranging the order thereof into the same order of the image data as that on the frame.

With the video signal digital magnetic recording and/or reproducing apparatus having the above-mentioned construction, a video signal is subjected to the recording and reproducing operation.

In the recording operation, image data in n (n: integer) fields input sequentially in the order same as that of the data in the frame are rearranged into an image block data array by the input shuffling means where each image block consists of image data of i horizontal pixels×j vertical pixels×n fields (i and j: integers). In the above case, there is formed an image block group composed of m (m>1) image blocks which are located apart from each other in the frame, and the image block data are successively generated in units of image block groups.

By the coding means, a predetermined data compression is effected on each group of m image blocks to convert the image data into coded data. Consequently, the total amount of the resultant coded data becomes constant after coding every image block group. Meanwhile, the amount of the coded data of each image block differs in respective image blocks.

By the data length adjusting means, the coded data of the image block group of m image blocks are converted into m number of sync block data. Data of each sync block is comprised of a low frequency component of coded data of one image block and a high frequency component of coded data of another image block in the same image block group.

By the recording deshuffling means, the sync block data are rearranged so that a relation between two adjoining sync blocks on the video tracks of a magnetic tape is maintained as a relation of vicinity between image blocks corresponding to the sync blocks in a frame. A parity, an ID, and a sync pattern are added to the data of each sync block, and thereafter the resulting data are successively recorded onto the video track of the magnetic tape by means of a recording head. As a result, the relation between two sync blocks adjoining each other on the video track is maintained as a relation of vicinity between the corresponding image blocks in the frame.

In the high-speed playback mode, the reproducing head traverses the video tracks. Data to be reproduced from one video track is subjected to sync detection as well as to error detection and correction and the resulting data is then converted into a plurality of sync block data by a sync block reproduction means. The sync block data are written into a memory having a capacity for storing data corresponding to n fields. In the memory the reproduction data are sequentially overwritten, and therefore reproduction data of a plurality of frames exist in mixture in the memory.

By the reproduction shuffling means, the sync block data read out of the memory are rearranged in the order for decoding.

A decoding of a variable length coded data is effected by the decoding means. In the high-speed playback mode, the decoding is performed in units of sync block data. In other words, only the lower component of the data of each sync block is used for the decoding to produce the image data of the image block corresponding to the sync block.

By the output deshuffling means, the decoded image block data are rearranged to form image data for a playback frame corresponding to n fields. Although the playback frame is formed by a combination of image data of a plurality of frames recorded on the magnetic tape, the image data reproduced from one video track on the magnetic tape are almost adjoining each other in the playback image on the screen.

As described above, since the data shuffling operation is effected before data compression, a high compression efficiency can be achieved. Furthermore, since the image data reproduced from one video track in the high-speed playback mode are almost adjoining each other in the playback frame, a visually improved playback image picture can be achieved without degradation in picture quality.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

The following describes preferred embodiments of the present invention with reference to the drawings.

Reference is first made to a recording operation of a magnetic recording and/or reproducing apparatus in accordance with an embodiment of the present invention.

EXAMPLE 1

The following describes a case where data of one frame are recorded onto five video tracks of a magnetic recording tape. In this example, the frame is divided into five parts.

Figure 1:
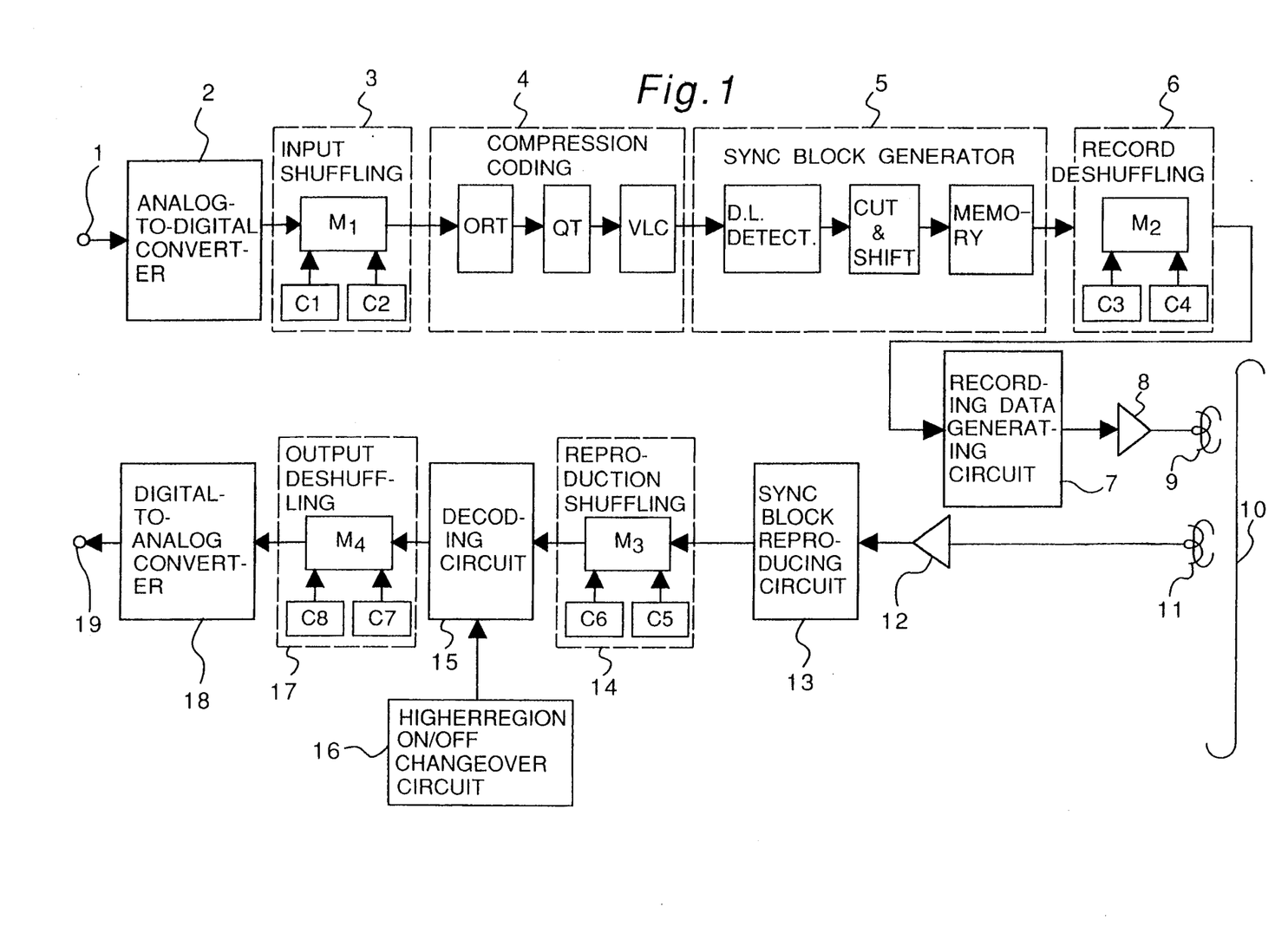
FIG. 1 is a block diagram of a digital magnetic recording and reproducing apparatus in accordance with an embodiment of the present invention.

Referring to FIG. 1, in a recording section designated by reference numerals 1 through 9 of a magnetic recording and/or reproducing apparatus, an analog video signal applied through an input terminal 1 is converted into digital image data by means of an analog-to-digital converter 2.

An input shuffling unit 3 receives digital image data arranged in an order same as that of the image data in a frame and shuffles the received image data to form a specified number of image blocks separated from each other in the frame while each of the image blocks is composed of a specified number of pixels adjoining each other in the frame, thereafter the order of the image data is rearranged into a different order thereof every image block. That is, the input shuffling unit 3 has an image data memory M1 controlled by a pair of write and read address control units C1 and C2 for storing image data corresponding to at least one field image data. The input shuffling unit 3 divides one field or frame image data into a specified number of image blocks which are aligned at original image block positions and selectively reads out among the specified number of image blocks which are spaced a predetermined distance from each other and aligns the read out image blocks in a predetermined order to define one image block group.

Thus, the digital image data array is shuffled by means of the input shuffling unit 3 in such a manner that the order of the digital image data array is rearranged appropriate for subjecting to a subsequent high-efficiency coding process.

Figure 2:
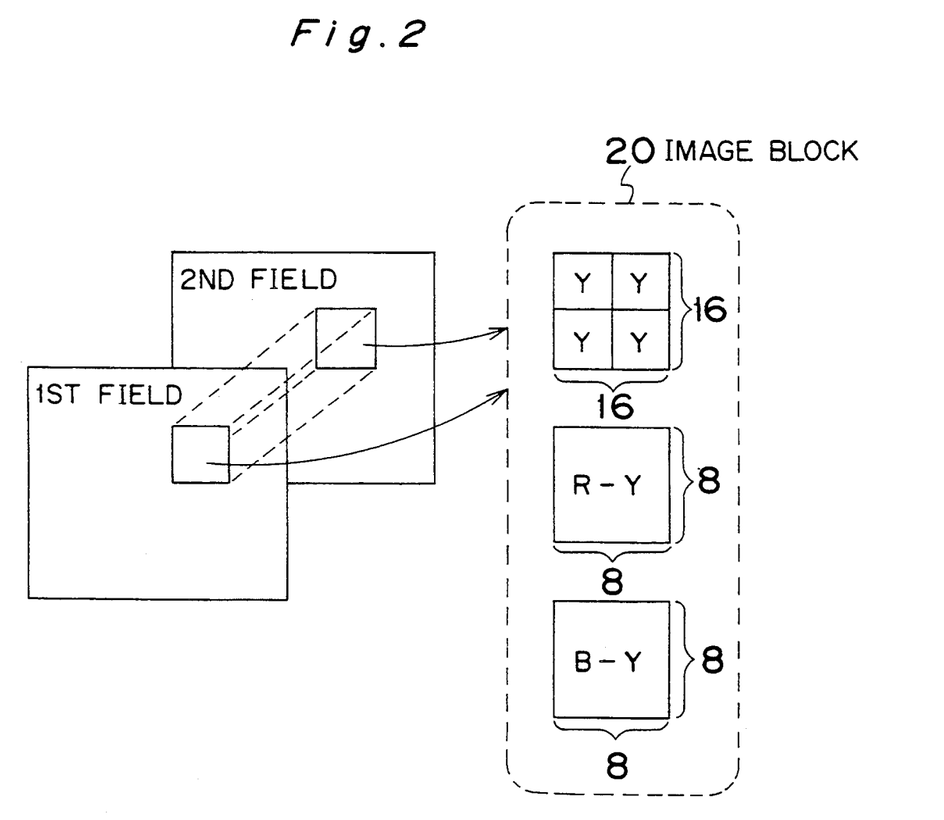
FIG. 2 is a schematic view for explaining an image block of a digital magnetic recording and reproducing apparatus in accordance with an embodiment of the present invention.

In more detail, the image data in the first and second fields are respectively divided into a specified number of rectangular blocks and a pair of first and second field rectangular blocks is shown in FIG. 2. An image block 20 is comprised of Y, R-Y and B-Y components. A Y component is composed of 8 pixels×4 lines×2 fields×4, a R-Y component is composed of 8 pixels×4 lines×2 fields×1, and a B-Y component is composed of 8 pixels×4 lines×2 fields×1.

Figure 3:
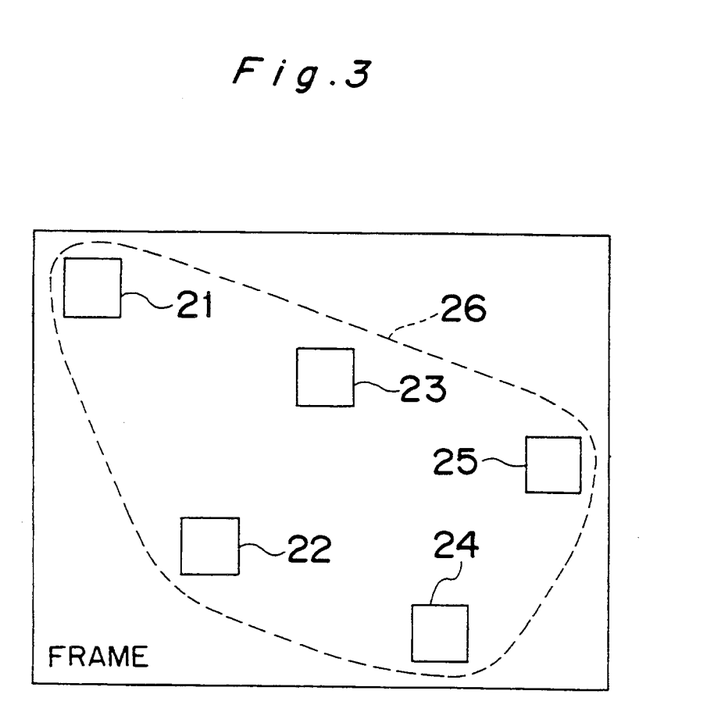
FIG. 3 is a block diagram of an image block group of a digital magnetic recording and reproducing apparatus in accordance with an embodiment of the present invention.

As shown in FIG. 3, an image block group 26 is composed of five image blocks 21 through 25 which are located apart from each other in a frame. Image data are output from the input shuffling unit 3 every image block group and then applied to the coding unit 4.

Subsequently, the coding unit 4 codes the image blocks such that the coded image blocks in each image block group has a total data amount equal to or less than a predetermined data length thereby to effect a variable length coding in each image block. That is, by the coding unit 4, a predetermined data compression is effected on each group of five image blocks to convert the image data into coded data. The total amount of the resultant coded data becomes constant after coding every image block group. Meanwhile, the amount of the coded data of each image block differs in respective image blocks. In more detail, after the image data is subjected to orthogonal transformation (ORT) and other processes such as quantization (QT) for each image block in the coding unit 4. The resulting data are subjected to a variable length coding (VLC) so that the total data amount of the coded data falls within five sync blocks in each image block group as shown in FIG. 4.

Figure 4:
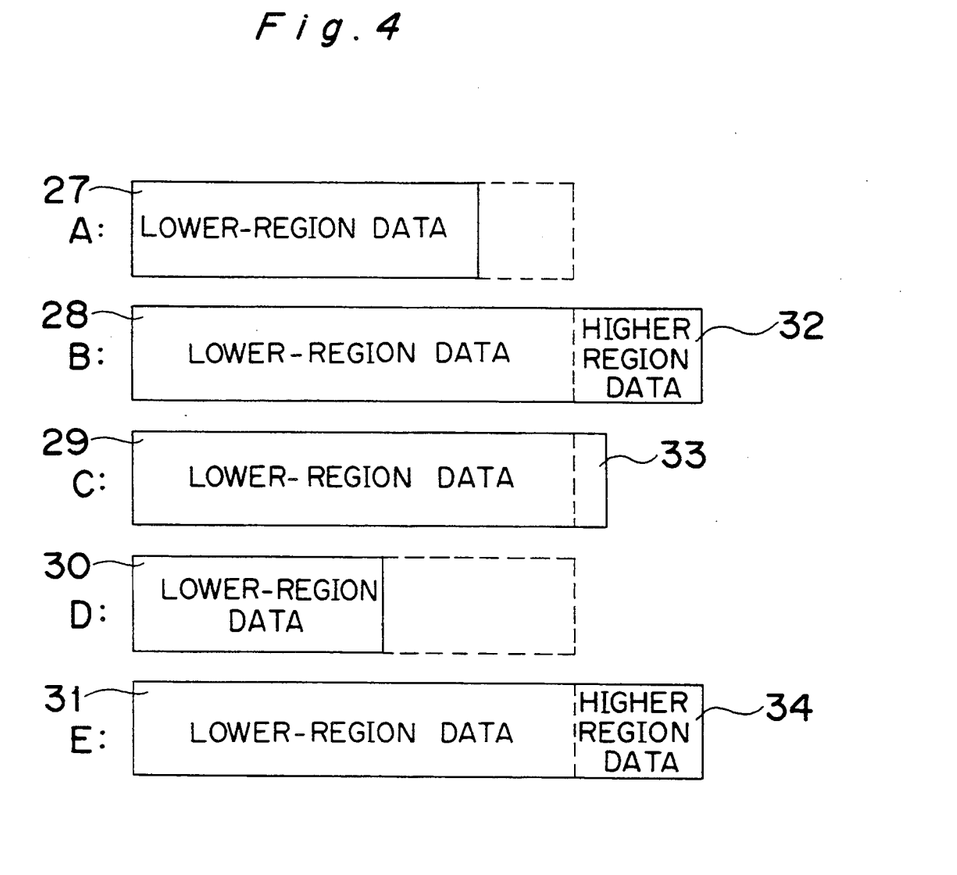
FIG. 4 is an explanatory view for explaining coded data of image blocks of a digital magnetic recording and reproducing apparatus in accordance with an embodiment of the present invention.

Referring to FIG. 4, the coded data of each image block has different data length. The data length as indicated by the dotted lines in FIG. 4 shows the data length of a sync block data. The coded data are then applied to a sync block data generating unit 5 which serves as a data length adjusting means.

That is, the sync block data generating unit 5 adjusts data length of each image block to form sync block data by detecting the data length of the coded data by means of a data length detector (D.L. DTCT.) and cutting a coded image block which has a data length longer than a predetermined sync block data length by means of a CUT/SHIFT unit so as to be equal to one sync block data length. The cut-off data portion is added to a coded image block which has a data length shorter than one sync block data length to fill the data length therewith.

In more detail, in the sync block data generating unit 5, the coded data of each image block are stored into different sync block data areas A through E successively beginning from the lower component thereof. It is noted here that the data stored in the sync block data area are referred to as "the lower frequency component data" In the coded data of the image blocks shown in FIG. 4, the lower frequency component data are designated by reference numerals 27 through 31. Data which overflow the sync block data area are referred to as "higher frequency component data". In more detail, the higher frequency component data are designated by reference numerals 32, 33 and 34 in the image block coded data as shown in FIG. 4. In any of the sync block data areas (A and D in this case) having a further space after storing the lower-frequency region data, the above-mentioned higher frequency component data 32 through 34 are further stored so that the five sync block data areas A through E are filled with sync block data. In other words, the coded data of five image blocks are all stored into five sync block data areas.

Figure 5:
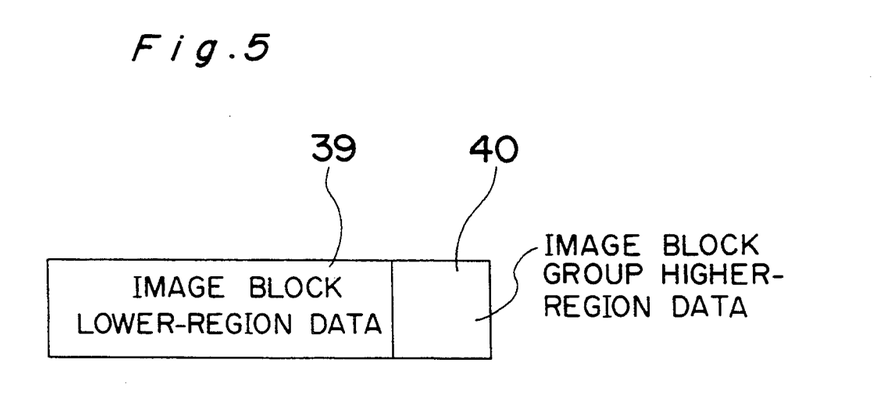
FIG. 5 is an explanatory view for explaining a sync block data of a digital magnetic recording and reproducing apparatus in accordance with an embodiment of the present invention.

Consequently, as shown in FIG. 5, there are formed five pieces of sync block data each composed of image block lower frequency component data 39 and image block group higher frequency component data 40, and the data of each sync block correspond to one image block. The five pieces of sync block data are input to a subsequent recording deshuffling unit 6.

The recording deshuffling unit 6 has a coded image data memory M2 which is controlled by a pair of write and read address controllers C3 and C4. The memory M2 stores the coded image blocks fed from the data length adjusting means (5) at positions corresponding to said original image block positions. The coded image data aligned corresponding to the original image block positions is divided into a plurality of stripes in a predetermined direction, where each stripe has a data width corresponding to one or more image blocks. The recording deshuffling unit 6 sequentially reads the stripes of the coded image data thereby to deshuffle the sync block data.

In more detail, by means of the recording deshuffling unit 6, the sync block data are rearranged so that a relation between any two adjoining sync blocks on the video tracks of a magnetic tape is maintained as a relation of vicinity between image blocks corresponding to the sync blocks in a frame. Therefore, the image blocks corresponding to the sync block data are located adjacent to each other in the frame.

In the first example of the present embodiment, image data of one frame are recorded onto five video tracks of a magnetic recording tape and the frame is divided into five parts.

Figure 8:
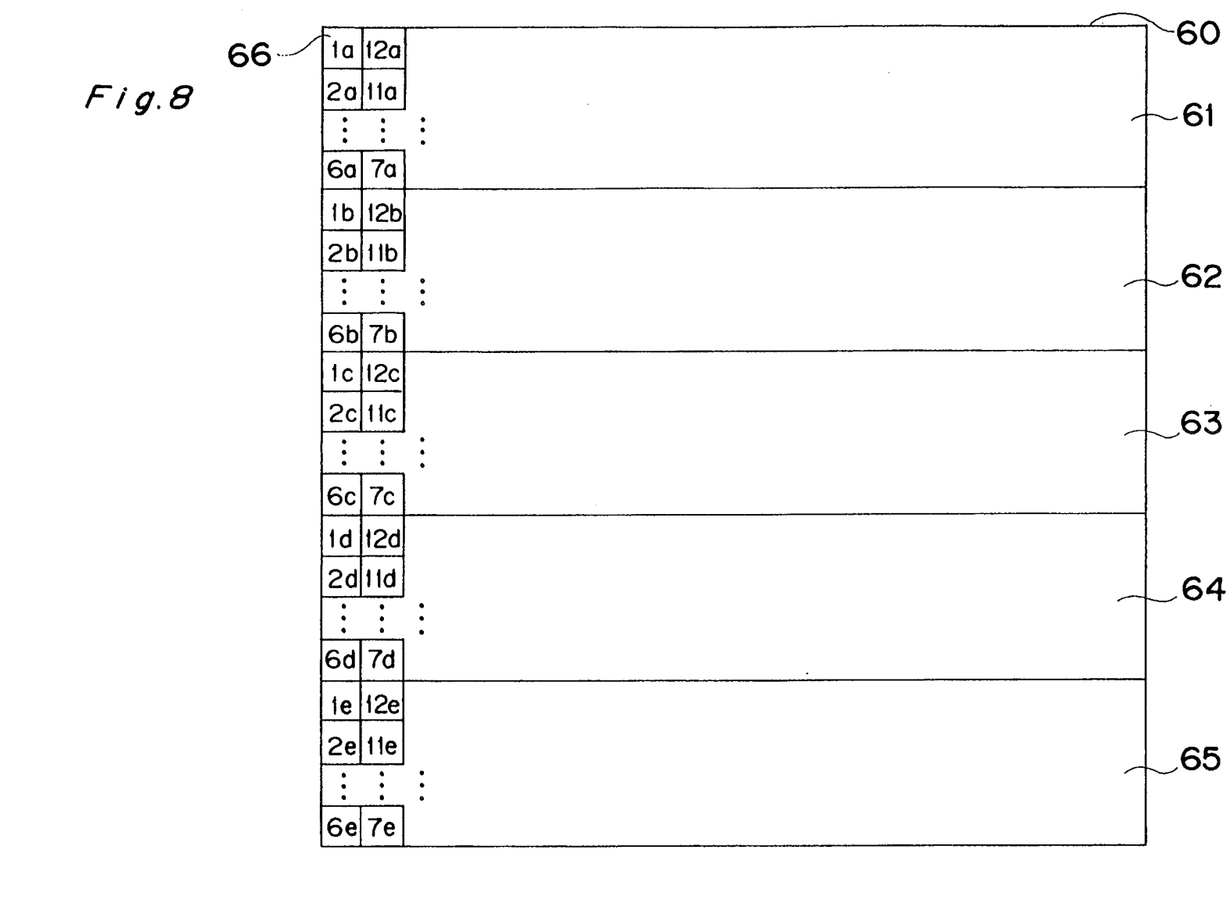
FIG. 8 is an explanatory view for explaining a frame division in a digital magnetic recording and reproducing apparatus in accordance with a first embodiment of the present invention.

As shown in FIG. 8, a frame 60 is divided, for instance, horizontally in five parts to form five frame portions 61 through 65. When the effective image data of a luminance signal of a video signal includes 720 pixels horizontally by 480 lines vertically per a frame, each of the five frame portions 61 through 65 consists of 45 image blocks in the horizontal direction and 6 image blocks in the vertical direction. Consequently, 270 pieces of such image blocks 66 are included in each frame portion, which are rearranged in the order as shown in FIG. 8. In practical, the sync block data are rearranged in the order of 1a, 2a, . . . , 270a in the first frame portion 61; 1b, 2b, . . . , 270b in the second frame portion 62; 1c, 2c, . . ., 270c in the third frame portion 63; 1d, 2d, . . . , 270d in the fourth frame portion 64; 1e, 2e . . . , 270e in the last frame portion 65. The sync block data rearranged as mentioned above are applied to a recording data generating unit 7.

Figure 6:
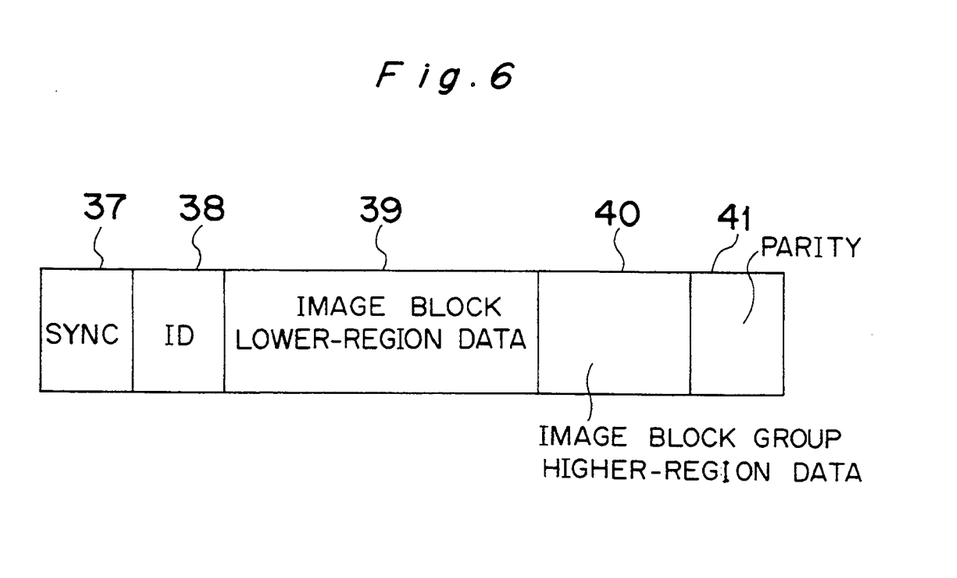
FIG. 6 is an explanatory view for explaining a sync block of a digital magnetic recording and reproducing apparatus in accordance with an embodiment of the present invention.
Figure 7:
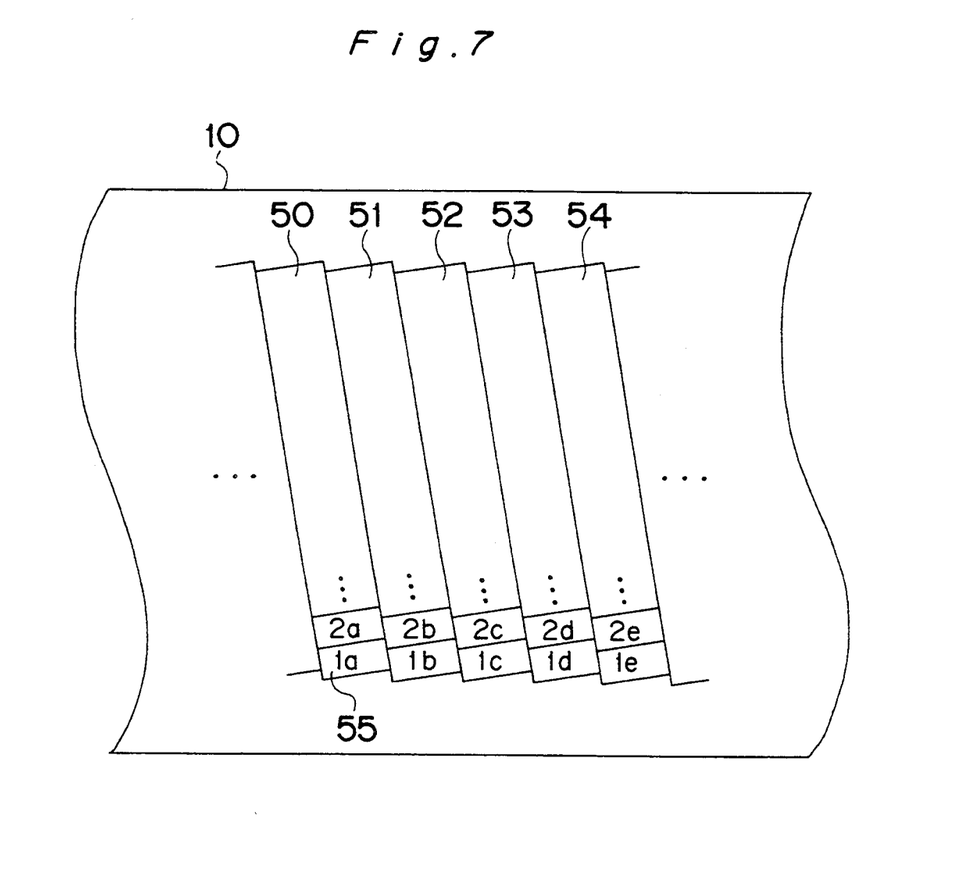
FIG. 7 is an explanatory view for explaining a relation between video tracks and sync blocks on a magnetic tape in a digital magnetic recording and reproducing apparatus in accordance with a first embodiment of the present invention.

In the recording data generating unit 7, a parity 41, an ID 38 and a sync pattern data 37 are added to the data of each sync block to form a sync block as shown in FIG. 6. The sync block is recorded onto a magnetic recording tape 10 via a recording amplifier 8 and a recording head 9. The image blocks 66 in the first frame portion 61 are recorded onto sync blocks 55 in the first video track 50. Since each image block is recorded onto each sync block in the order as shown in FIG. 7, arbitrary two sync blocks adjoining each other on the video track also adjoin each other in the frame. In the same manner, the image blocks in the frame portions 62 through 65 are recorded respectively onto the video tracks 51 through 54.

The following describes a high-speed playback operation of the preferred embodiment according to the present invention.

Referring back to FIG. 1, in the high-speed playback mode, a reproducing head 11 traverses a plurality of tracks of a recording tape in one scan, and the resulting reproduction data is applied to a sync block reproducing unit 13 via a reproduction amplifier 12. In the sync block reproducing unit 13, the reproduction data is subjected to sync detection operation as well as error detection and correction, and then the resultant error-free sync block data is applied to a reproduction shuffling unit 14.

In the reproduction shuffling unit 14, the sync block data is stored in a specified address of a memory M3 controlled by a pair of write and read address control units C5 and C6 according to the ID data so that the sync block data is arranged in the order as in the image block group. The memory M3 stores sync block data corresponding to one frame. In the high-speed playback mode, sync block data of a plurality of frames exist in mixture. The data read out of the memory is applied to a decoding unit 15. Meanwhile, a higher-frequency turn-off signal is applied from a changeover unit 16 turning higher-frequency on/off to the decoding unit 15.

In the decoding unit 15, only the lower-frequency region data of each sync block data is used for decoding the image block corresponding to each sync block. The decoded image block data is applied from the decoding unit 15 to an output deshuffling unit 17 in which the decoded image block data is rearranged to produce playback image data of one frame. The playback image data is generated from an output terminal 19 via a digital-to-analog converter 18. Although the output image picture includes data of a plurality of frames reproduced from the magnetic tape, the image data reproduced from one video track adjoin each other in the playback picture on the screen thereby to suppress deterioration of picture quality.

EXAMPLE 2

Figure 9:
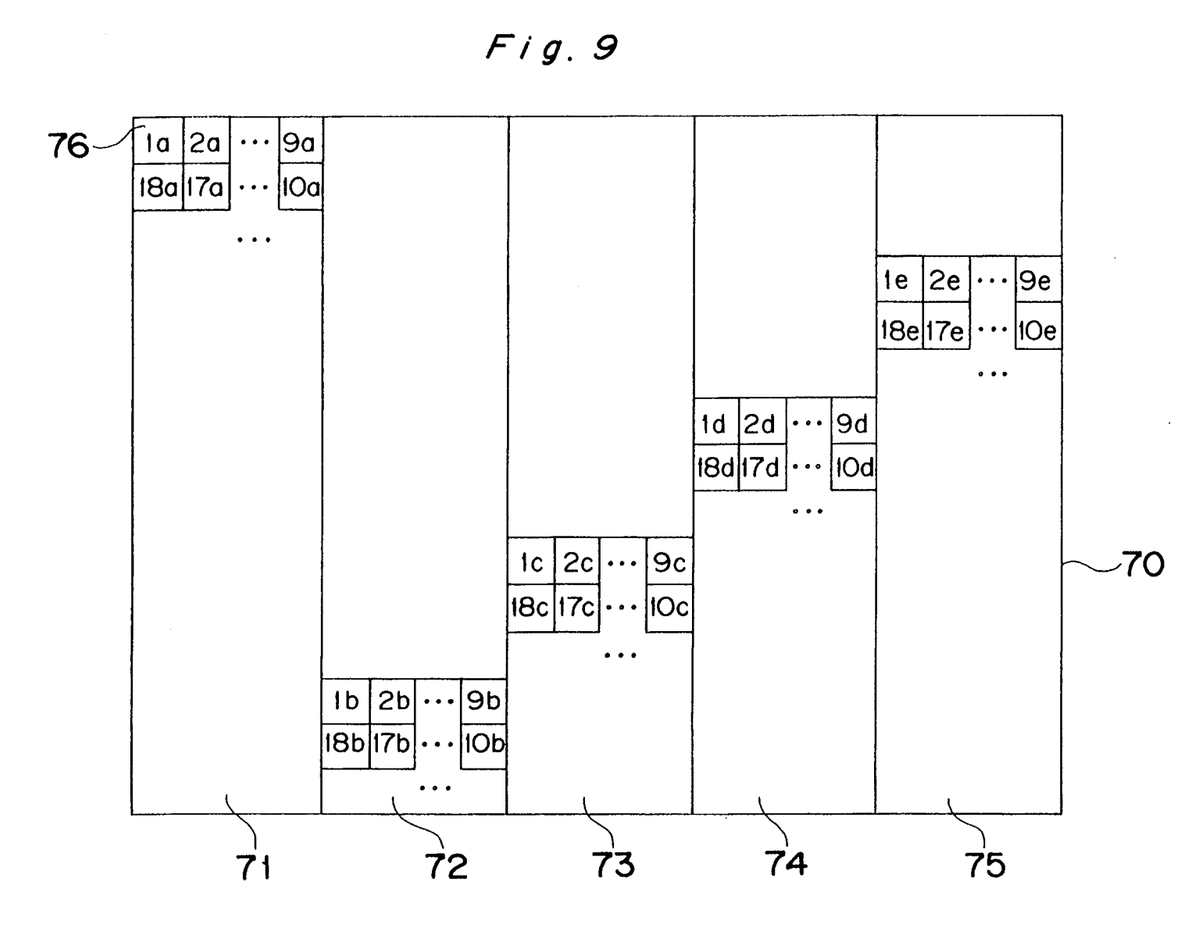
FIG. 9 is an explanatory view for explaining a frame division of a digital magnetic recording and reproducing apparatus in accordance with a second embodiment of the present invention.

The following describes a second example of a frame dividing manner with reference to FIG. 9.

As shown in FIG. 9, a frame 70 is divided into five parts in a vertical direction thereof to form five frame portions 71 through 75. When the effective image data of the luminance signal of a video signal includes 720 pixels in the horizontal direction by 480 lines in the vertical direction per a frame, each of the frame portions 71 to 75 consists of 9 image blocks in the horizontal direction and 30 image blocks in the vertical direction, i.e., total 270 image blocks 76. The image blocks 76 are arranged in the order as shown in FIG. 9, and an offset is established at the recording position on the track for each frame portion. More concretely, the sync block data are rearranged in the order of 1a, 2a, . . . , 1b, 2b, . . . , 1c, 2c, . . . , 1d, 2d, . . . , 1e, 2e, . . . . The sync block data rearranged as mentioned above are recorded onto a magnetic recording tape in the same manner as in the first example to be subjected to the high-speed playback operation.

Regarding the playback image data of the present case in the high-speed playback mode at a tape feeding speed corresponding to the offset value, the image data of the frame portions 71 through 75 of an identical frame recorded on the magnetic tape is almost adjoined each other in the frame.

EXAMPLE 3

Figure 10:
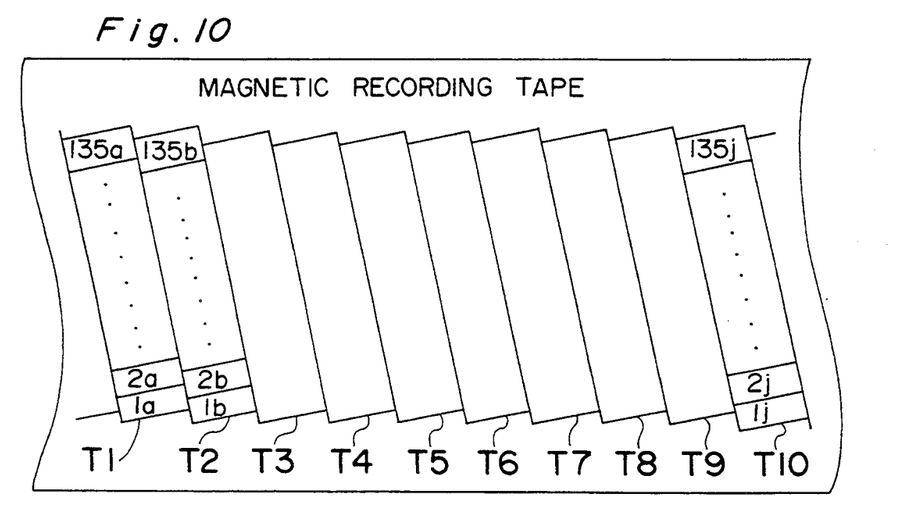
FIG. 10 is an explanatory view for explaining a relation between video tracks and sync blocks on a magnetic tape in a digital magnetic recording and reproducing apparatus in accordance with a third embodiment of the present invention.
Figure 11:
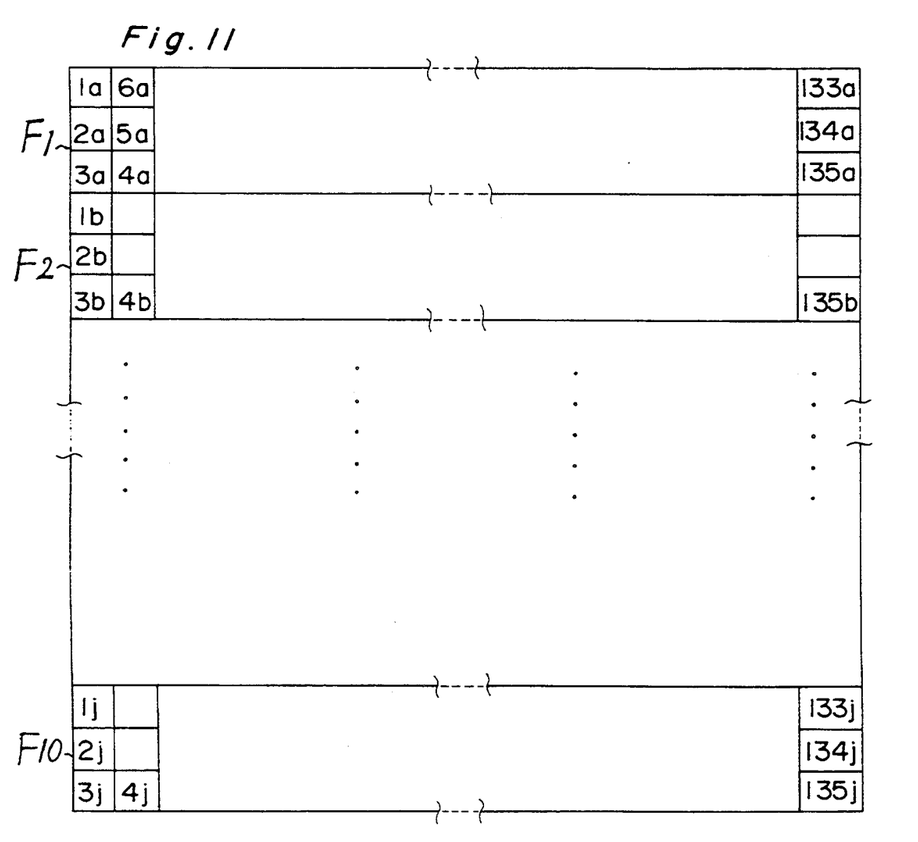
FIG. 11 is an explanatory view for explaining a frame division of a digital magnetic recording and reproducing apparatus in accordance with a third embodiment of the present invention.

The following describes a third example of a frame dividing manner with reference to FIGS. 10 and 11.

As shown in FIG. 11, in practical, a frame 80 is divided into ten parts in a horizontal direction thereof to form ten frame portions F1 through F10. When the effective image data of a luminance signal of a video signal includes 720 pixels horizontally by 480 lines vertically per a frame in the same manner as in the first example, each of the ten frame portions F1 through F10 consists of 45 image blocks in the horizontal direction and three image blocks in the vertical direction. Consequently, 135 pieces of such image blocks 96 are included in each frame portion, which are rearranged in the order as shown in FIG. 11. In practical, the sync block data are rearranged in the order of 1a, 2a, . . . , 135a in the first frame portion F1; 1b, 2b, . . . , 135b in the second frame portion F2; . . . ; 1j, 2j, . . . , 135j in the last frame portion F10. The image blocks 96 in the frame portions F1 through F10 are respectively recorded onto sync blocks in the video tracks T1 through T10. Since each image block is recorded onto each sync block in the order as shown in FIG. 10, arbitrary two sync blocks adjoining each other on the video track also adjoin each other in the frame in the same manner as in the first example.

The above-mentioned frame dividing manner is an example of the embodiment, and there may be employed a variety of other modified frame dividing manners for each block.

Regarding the field number for a frame, although two fields are selected for a frame in the embodiment, it is not limited to this and there can be a way of selecting n fields for a frame so that each image block is constructed by i horizontal pixels×j vertical pixels×n fields (i, j, and n: integers).

Moreover, in the embodiment, although the number of the image blocks is limited to five for composing an image block group, it is not limited to this and there may be selected m image blocks for each image block group.

Furthermore, in the embodiment, although the number of the video tracks is selected to five for one frame, it is not limited to this and each frame data may be recorded onto k (k: integer) video tracks in a similar manner. In other words, one frame is divided into k portions which are respectively recorded onto different k video tracks.

Figure 12:
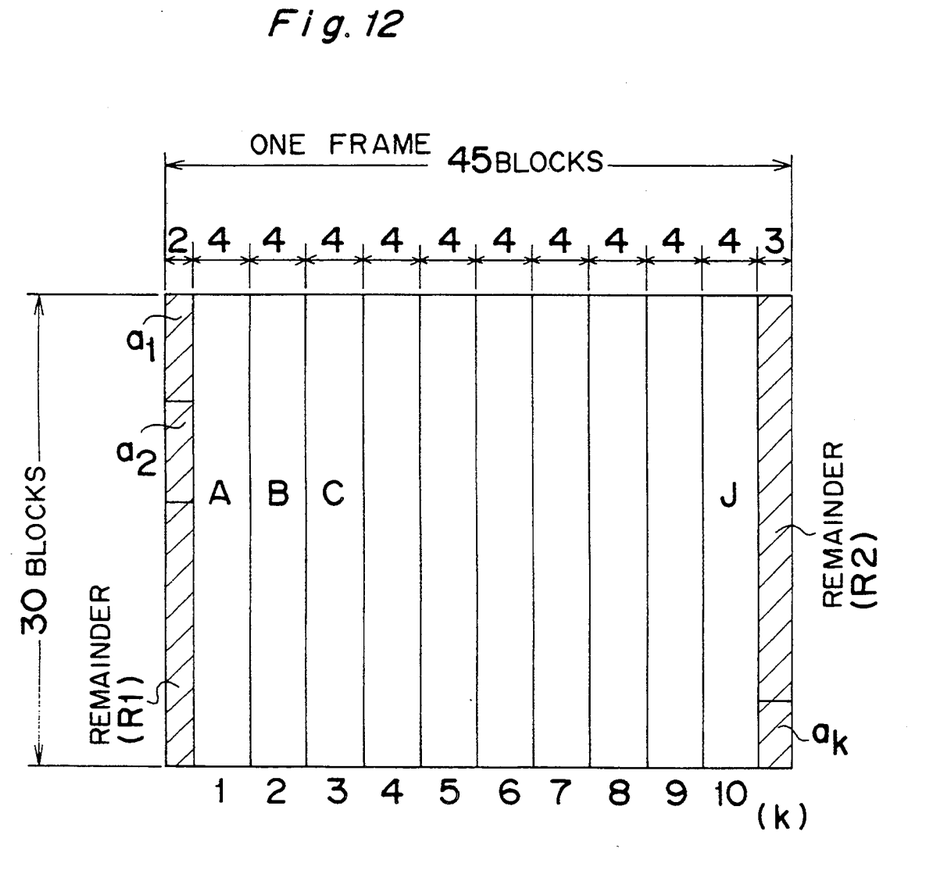
FIGS. 12 and 13 are explanatory views of allocating a remainder region of image blocks.
Figure 13:
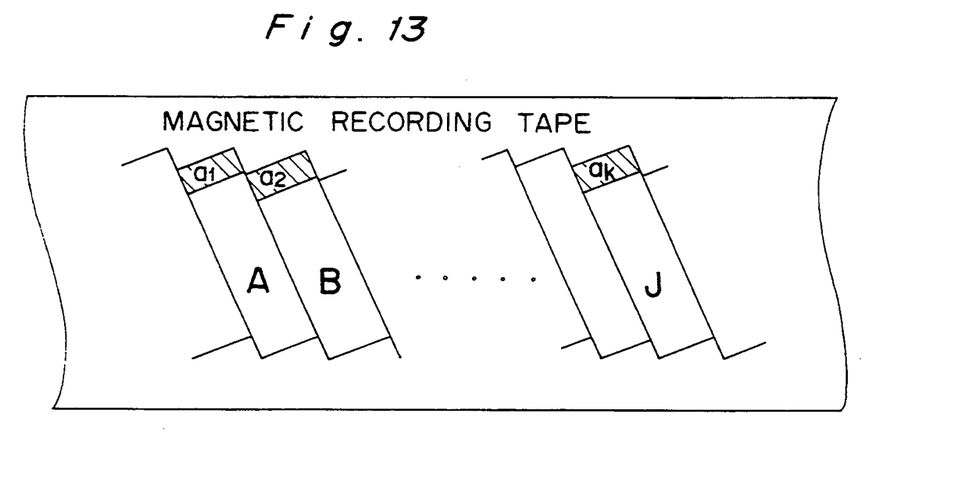

When dividing one frame into k rectangular parts, if there is a remainder region (R1, R2) of image blocks belonging to no rectangular portion as shown in FIG. 12, the remainder regions R1 and R2 of image blocks are divided into k pieces and recorded into a sync block to be sequentially located at an edge of each video track of the magnetic recording tape as shown in FIG. 13.

In another modified example of the present embodiment, the recording deshuffling operation may be effected on each track. In other words, when recording one frame onto k tracks, the sync block data array of one frame of a recording deshuffling input is divided into k portions, and a data rearrangement operation is performed in each divided sync block data array. Therefore, in this case, the recording deshuffling unit effects a deshuffling operation every 1/k portions of a frame.

In another modification of the present embodiment, the recording head records data in p (p: integer) channels approximately simultaneously on a magnetic tape. When one frame is recorded on p×k tracks, it is possible to arrange the sync blocks on the p tracks in the same order as the frame-sequential order of the image blocks corresponding to the sync blocks.

In another modification of the embodiment, there may be adopted a construction for effecting an error correction after the reproduction shuffling operation. In the above case, an error correction between tracks can be performed to achieve an improved capability for correcting a burst error and the like.

In another modified example of the present invention, it is possible to use the memory for storing the data of a plurality of frames commonly as a memory for the output deshuffling unit. In this construction, the data of each sync block is decoded, and the image block data is applied to the reproduction deshuffling unit while an address signal for designating a position in the frame is generated according to the ID of the sync block, so that the obtained address signal is applied to the reproduction deshuffling unit.

According to the embodiments of the digital magnetic recording and/or reproducing apparatus as described above, a data shuffling operation is effected before data compression to achieve a high compression efficiency, and since the image data reproduced from at least one video track almost adjoin each other in the playback picture in the high-speed playback mode, there can be assured a visually improved picture image on the screen.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A video signal digital magnetic recording and/or reproducing apparatus comprising:
    input shuffling means for shuffling input image data having an image data memory means for storing image data corresponding to at least one field image data, wherein said input shuffling means divides said one field image data into a specified number of image blocks which are aligned at original image block positions and selectively reads among the specified number of image blocks which are spaced a predetermined distance from each other and aligns said read image blocks in a predetermined order to define one image block group;
    coding means for coding said image blocks such that the coded image blocks in each image block group has a total data amount equal to or less than a predetermined data length thereby to effect a variable length coding in each image block;
    data length adjusting means for adjusting data length of each image block to form sync block data by cutting a coded image block which has a data length longer than a predetermined sync block data length so as to be equal to one sync block data length and filling the cut data portion to be added to a coded image block which has a data length shorter than one sync block data length; and
    recording deshuffling means having a coded image data memory means for storing said coded image blocks from said data length adjusting means at positions corresponding to said original image block positions, said coded image data aligned corresponding to said original image block positions being divided into a plurality of frame portions in a first direction, each frame portion having a data width corresponding to one or more image blocks, wherein said recording deshuffling means sequentially reads the frame portions of said coded image data thereby to deshuffle the sync block data.

2. The video signal digital magnetic recording and/or reproducing apparatus as claimed in claim 1 further comprises reproduction shuffling means for rearranging the order of the sync block data reproduced from a magnetic tape into an order of decoding the data.

3. The video signal digital magnetic recording and/or reproducing apparatus as claimed in claim 2 further comprises decoding means for converting a lower frequency component of the coded data included in each sync block into image data of each image block.

4. The video signal digital magnetic recording and/or reproducing apparatus as claimed in claim 3 further comprises output deshuffling means for deshuffling the decoded image data and rearranging the order thereof into the same order of the image data as that on the frame.

5. The video signal digital magnetic recording and/or reproducing apparatus as claimed in claim 1, wherein each of the image blocks formed by said input shuffling means is composed of i horizontal pixels×j vertical pixels×n fields (i, j, and n: integers) and each image block group is composed of m image blocks (m: integer).

6. The video signal digital magnetic recording and/or reproducing apparatus as claimed in claim 1, wherein said recording deshuffling means divides a frame into k portions (k: integer) and rearranges the sync block data so that the data of image blocks in each of the divided frame portions are successively recorded onto one video track.

7. The video signal digital magnetic recording and/or reproducing apparatus as claimed in claim 1, wherein said recording deshuffling means divides a frame into k portions (k: integer) and rearranges the sync block data so that the data of image blocks in each of the divided frame portions are successively recorded onto a plurality of video tracks.

8. The video signal digital magnetic recording and/or reproducing apparatus as claimed in claim 1, wherein said recording deshuffling means deshuffles the sync block data on each track of a magnetic tape.

9. The video signal digital magnetic recording and/or reproducing apparatus as claimed in claim 1, wherein said input image data is recorded by means of a recording head in p (p: integer) channels approximately simultaneously on a magnetic tape.

10. The video signal digital magnetic recording and/or reproducing apparatus as claimed in claim 9, wherein when one frame is recorded on p×k tracks, the sync blocks on the p tracks are arranged in the same order as that of the image blocks in the frame corresponding to the sync blocks.

11. The video signal digital magnetic recording and/or reproducing apparatus as claimed in claim 1, wherein said input shuffling means receives digital image data arranged in the same order as that of the image data in a frame.

12. The video signal digital magnetic recording and/or reproducing apparatus as claimed in claim 1, wherein said data length adjusting means forms sync block data by cutting a high frequency component as the cut data portion of a coded image block to be added so that each sync block includes a lower frequency component of coded data of at least one image block.

* * * * *